June 26, 1923.
C. W. BURROWS
1,459,970
METHOD OF AND APPARATUS FOR TESTING MAGNETIZABLE OBJECTS
Filed July 25, 1917    5 Sheets-Sheet 1
Fig. 1.
Fig. 2.
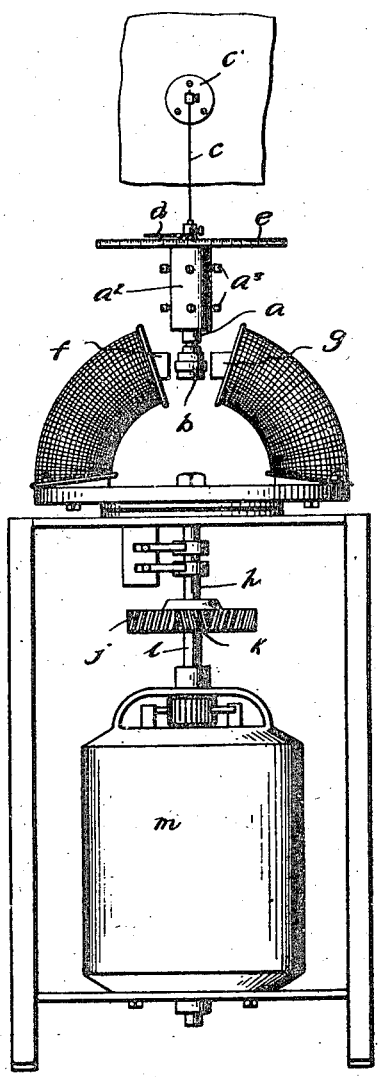
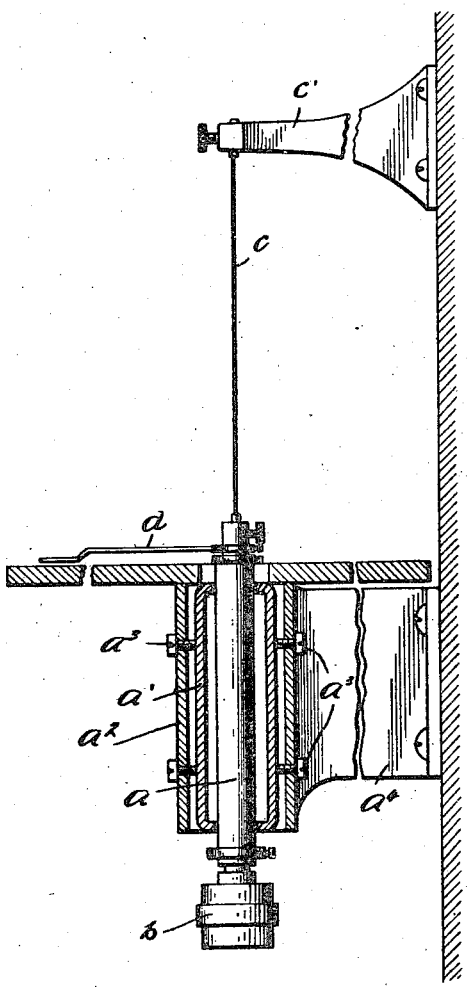
Inventor
Charles W. Burrows
By Alexander Lowell
Attorneys

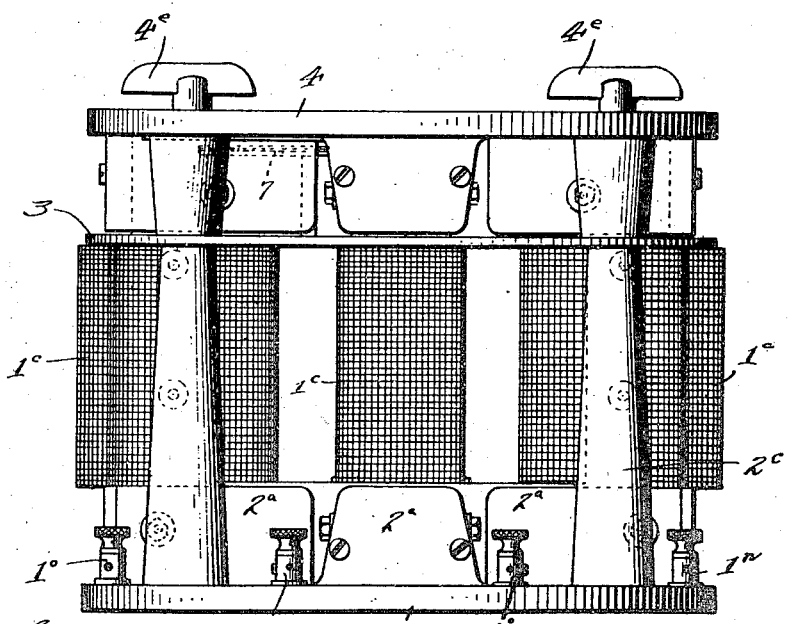
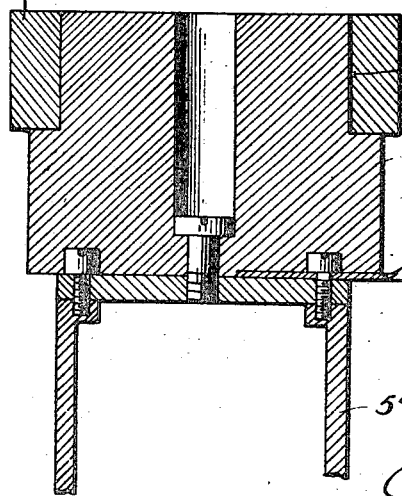
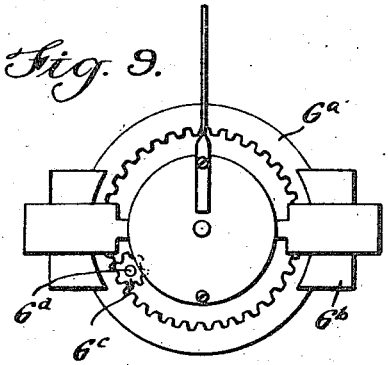

June 26, 1923.

C. W. BURROWS 1,459,970

METHOD OF AND APPARATUS FOR TESTING MAGNETIZABLE OBJECTS

Filed July 25, 1917    5 Sheets-Sheet 3

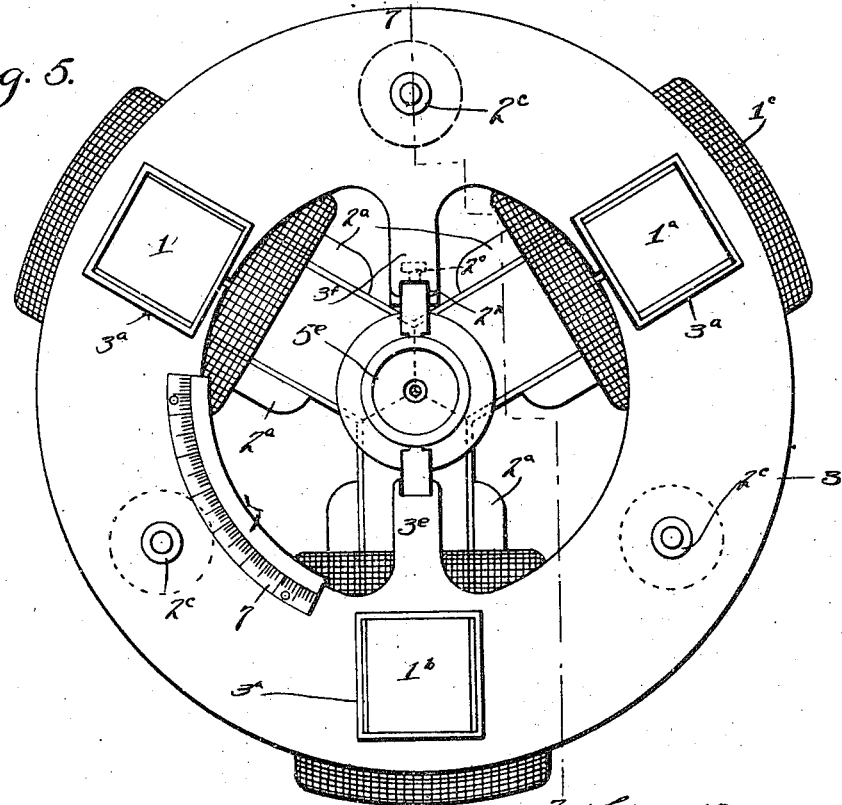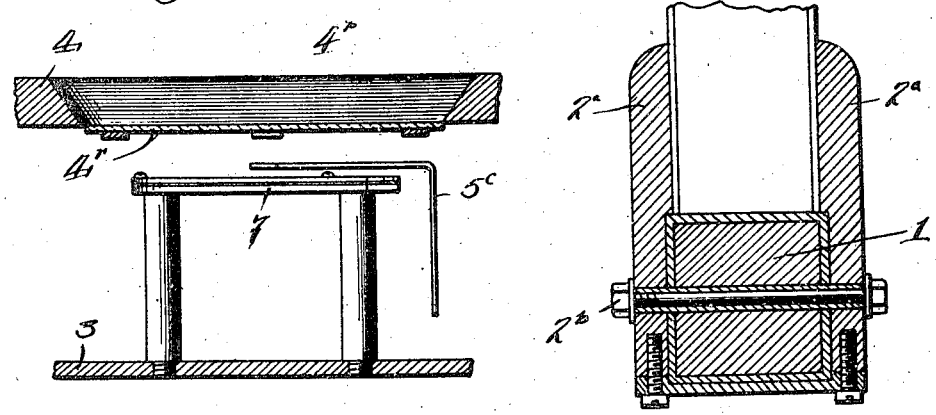

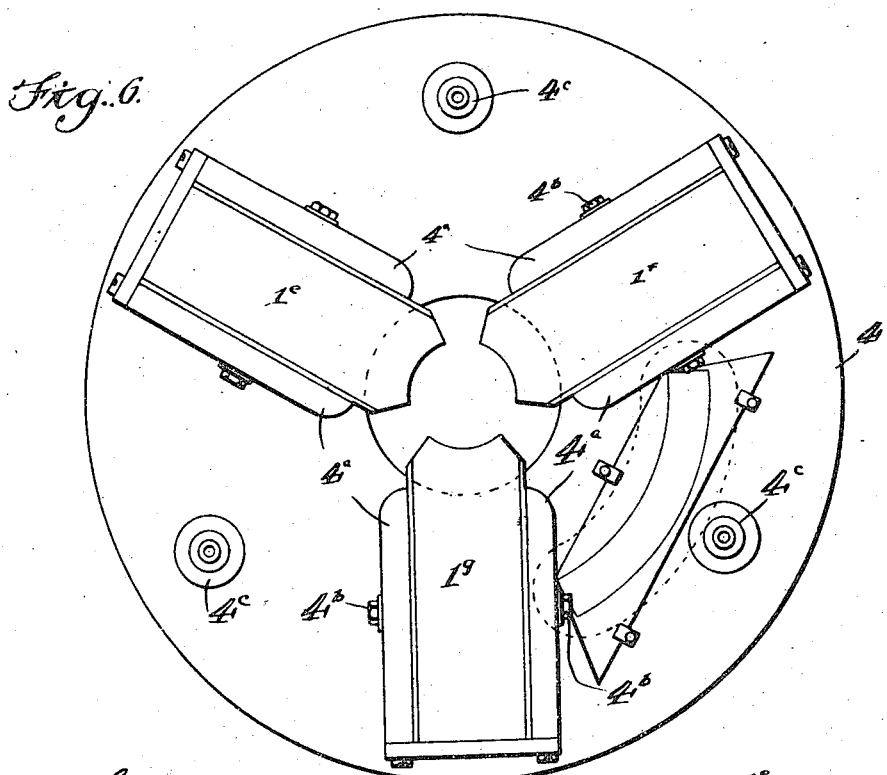
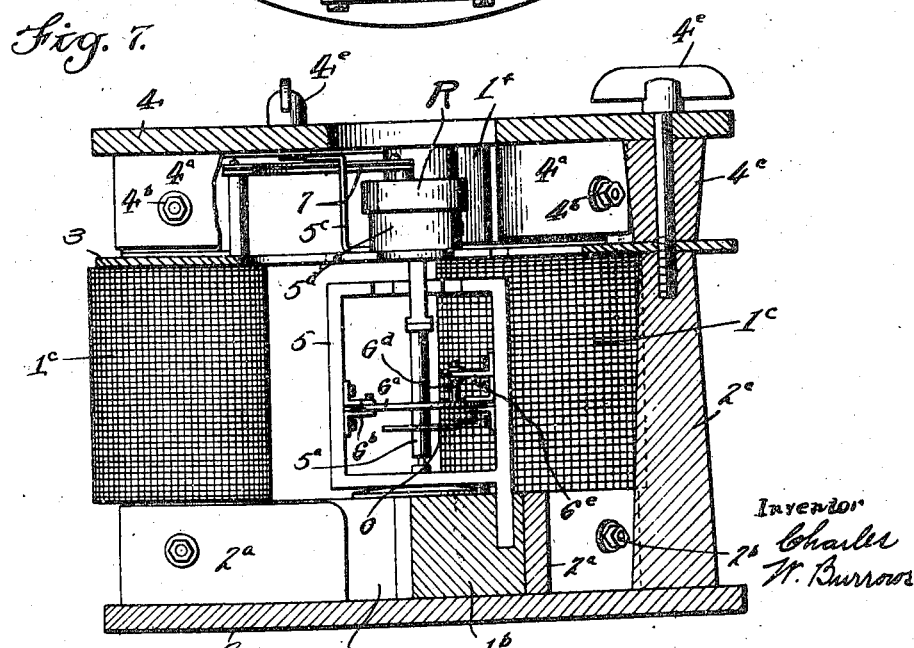

Patented June 26, 1923.

1,459,970

UNITED STATES PATENT OFFICE.

CHARLES W. BURROWS, OF WASHINGTON, DISTRICT OF COLUMBIA, ASSIGNOR OF ONE-FOURTH TO RUDOLPH J. WIG, OF WASHINGTON, DISTRICT OF COLUMBIA.

METHOD OF AND APPARATUS FOR TESTING MAGNETIZABLE OBJECTS.

Application filed July 25, 1917. Serial No. 182,716.

*To all whom it may concern:*

Be it known that I, CHARLES W. BURROWS, a citizen of the United States, residing at Washington, District of Columbia, have invented certain new and useful Improvements in Methods of and Apparatus for Testing Magnetizable Objects; and I hereby declare that the following is a full, clear, and exact description thereof, reference being had to the accompanying drawings, which form part of this specification.

The object of this invention is to enable the relative hardness or structural quality of small objects made of magnetizable material such as iron or steel to be determined by what I term magnetic analysis. This "magnetic analysis" consists in the determination of the magnetic characteristics, or a number of magnetic characteristics of a given magnetizable body, such as a steel object, and from and by these determining the physical properties of such body or object.

The science of "magnetic analysis" consists of the systematic correlation of the magnetic and other properties of materials and of the application of the laws and principles which underlie the interrelations of such properties, particularly the interrelations of the magnetic and mechanical properties of steel. It is based upon the fundamental fact of observation "that there is one, and only one, set of mechanical characteristics corresponding to a given set of magnetic characteristics, and conversely there is one, and only one, set of magnetic characteristics corresponding to a given set of mechanical characteristics."

The particular object of the present invention is to enable the physical qualities or relative hardness of the small magnetizable bodies or objects to be determined rapidly, and with practical commercial accuracy, without having to injure in any way the object being tested, and to provide a simple apparatus by which each and every article may be tested if desired, to determine whether or not it is above or below a predetermined standard; and to do away with the expensive and uncertain testing methods heretofore employed, such as subjecting the article to abrasion, mechanical stresses, or chemical treatment, or to microscopic analysis. It is well known that apparently similar or duplicate metallic objects will vary in physical and magnetic properties—f. i. steel objects made from the same ingot, and treated as nearly as possible by the same methods in their manufacture, will vary in their relative physical qualities, such as hardness and strength, according to variation in the temperatures, or differences of time of heating or cooling, or different mechanical stresses, to which they may have been subjected in their making; and they may also differ even if subjected as far as humanly possible to exactly the same conditions of treatment in every step of their process of manufacture; but I have discovered a method and means by which each such object may be readily tested by magnetic analysis and the differences therein immediately discerned.

The ideal test of a finished product is one which permits the examination of each individual object and does not assume that the characteristics of ninety-nine objects are identical with those of the hundredth one which may happen to be picked out for test. Magnetic analysis is adapted to such individual testing and not only permits the elimination of defective objects but also permits the grading of objects which, while satisfactory in general, are not all of the same degree of perfection, and will enable manufacturers to produce objects of a uniformity hitherto unknown and to guarantee such uniformity with surety.

To more readily enable others to fully understand the invention and its practicability, I will explain the same as adapted for and used for testing small metallic objects, such as ball races or rings commonly employed in ball bearings, which rings are made of highly tempered steel and must be capable of withstanding great pressure safely.

The present usual methods of testing such rings is by files for hardness, and by shock for brittleness; that is, after the rings have been formed, each ring is subjected to a file test by hand, and the operator is supposed to be skilled enough to determine by the effect of the file upon the ring whether or not it is suitably tempered and of sufficient hardness. If the ring passes this test, it is dropped from a predetermined height onto a non-yielding surface, and if it cracks is thrown aside. The file test is uncertain, as it depends upon the "feel" of the operator and the pressure and sharpness of the file; and the dropping test is uncertain because some rings will be flawed by the shock but not noticeably cracked, while unfit for service.

My invention avoids any mechanical stress or strain and obviates all uncertainty regarding the physical qualities of the rings; they can by my invention be tested at any stage of their process of manufacture, and also when finished; the test can be rapidly made by persons of ordinary intelligence and with greater certainty of results than is possibly obtainable by mechanical, chemical or microscopic methods.

I test such rings or like objects by subjecting them to magnetic analysis in a novel manner and by a novel apparatus which is based upon the fundamental fact that there is a definite relation between the magnetic and other physical properties of steel, which fact has been so thoroughly established that the successful application of magnetic analysis for commercially testing steel rings or like small objects in the manner hereinafter stated is assured.

In carrying out the present invention the ring, or object to be tested, is subjected to the action of a relatively rotated magnetic field of force, which field may be produced in various ways (as by rotating the magnet or magnets around the object to be tested, or rotating the object within the magnetic field, or establishing a rotating magnetic field by means of a polyphase current directed through an annular series of magnets, or by properly commutating a direct current successively through a series of properly arranged magnets, or by producing a split phase rotating field from a single-phase current) so that the object being tested is subjected to a rotative magnetic flux; and means are provided whereby the amount of the magnetic stress on such object or torque may be communicated to a suitable visual or audible indicator, and if desired to a suitable recorder; so that when the object is subjected to the action of such field, the operator can readily observe from the indicator the stress or torque exerted upon such object. Assuming, for instance, that a visual indicator is used the operator can, by noting its deflection, within certain limits, determine at once whether the object possesses the predetermined requisite physical qualities and is therefore to be accepted, or whether it lacks such qualities and is to be rejected. The definite standard by which the acceptability or rejection of the object to be treated is determined is to be previously ascertained as hereinafter explained.

I will first describe a simple laboratory apparatus for testing ball races and like objects and then a practical commercial apparatus for testing such objects.

Referring to the accompanying drawings,—

Figure 1 is an elevation of one apparatus embodying the invention, and Figure 2 is an enlarged sectional view of the upper portion of such apparatus.

Figure 3 is a side elevation of an apparatus particularly designed for testing ball-races, and the like objects.

Figure 5 is an enlarged plan view of the lower part of the apparatus shown in Fig. 3, the top plate and pole-pieces being removed.

Figure 6 is an underneath view of the top plate and attached pole-pieces.

Figure 7 is a detail sectional view on the line 7—7, Fig. 5.

Figure 8 is an enlarged detail view of the object-holder.

Figure 9 is a detail plan view of the object holding devices detached.

Figures 12 and 13 are detail sectional views.

Figure 4:
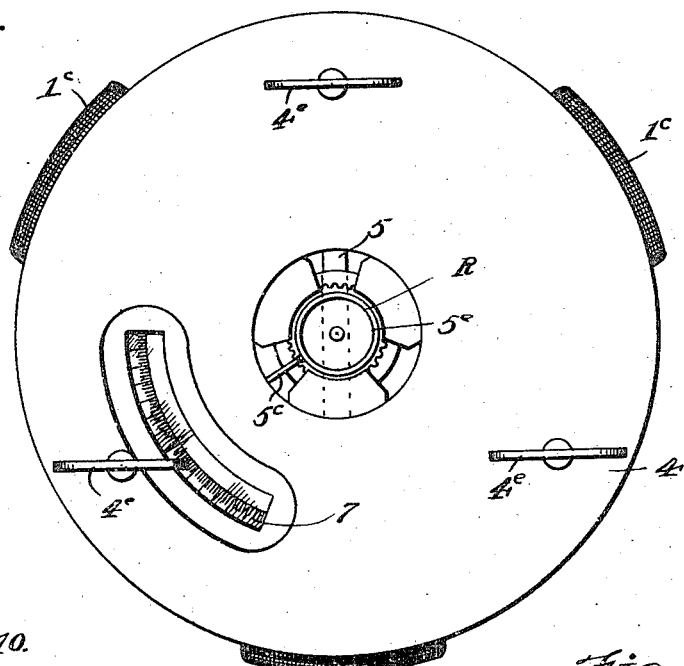
Figure 4 is a top plan view of Fig. 3.

Referring to Figs. 1 and 2, $a$ designates a holder for the object to be tested, which holder may be suspended by a torsion wire $c$ from any suitable overhead support or bracket $c'$. The holder is preferably guided in a sleeve $a'$ which in turn is adjustably mounted in a guide $a^2$ by means of tap screws $a^3$, and this guide $a^2$ may be fixedly supported by any suitable means, as by a bracket $a^4$ attached to the wall below bracket $c'$. The holder $a$ carries an indicator $d$ which is adapted to swing past a graduated scale $e$ mounted on the guide $a^2$.

The object $b$ may be attached to this holder $a$ in any suitable manner, so that it can be suspended between the opposed poles $f$ and $g$ of a rotatable magnet, which may be either a permanent magnet or an electro-magnet, an electro-magnet being indicated, and such magnet is mounted on a vertical shaft $h$ which is journaled in a suitable supporting frame $i$ beneath the holder, and carries a gear $j$ meshing with a pinion $k$ on the shaft $l$ of the armature of an electric motor $m$. All the aforesaid parts may be of any suitable or preferred construction, and are conventionally illustrated in the drawing, but those skilled in the art will be readily able to understand, construct and use the same.

When the magnet $f$—$g$ is rotated its poles move around the object $b$, and create a rotating magnetic field, and the magnetic flux or induction produced thereby in the object $b$ will tend to cause said object to turn with the magnet according to the physical nature of the object and the resistance of the torsion wire $c$ or other suitable spring means opposing the rotation of the object. The extent of such movement or magnetic stress or torque on the object is readily determined by noting the movement of the pointer $d$ on scale $e$ either during or after the period of deflection or rotation but before the magnetic torque or stress has dropped or ceased.

The magnetic stress or torque exerted by the rotating magnet upon the object continues an appreciable time after the rotation stops, and even a momentary rotation of the field is enough to cause a deflection of the object, if relatively small. The effect of whirling or rotation of the magnetic field upon a standard object $b$ having been previously determined and noted upon the scale $e$, the similarity of another like object to the standard object can be at once determined by substituting the same f r the standard object and observing whether or not the pointer $d$ is deflected to the same point on the scale $e$ that it assumed when the standard object $b$ was in position in the machine.

If for instance the parts had been so adjusted that the pointer $d$ would stand at zero when the standard object is in the machine under the action of the rotating field, it follows that if a like object, exactly corresponding with the standard object, is subjected to the same rotative field in the same manner, the pointer $d$ will move to the same point on the scale, and that any variation of the position assumed by the pointer above or below such point, would show that there was a magnetic difference between the objects being tested and the standard object, and a corresponding actual physical difference between the object being tested and the standard object. If in such test the pointer $d$ stops below such standard point—one kind of physical defect—as too great softness will be indicated; if the pointer $d$ passes above such standard point another physical defect—as excess hardness or brittleness will be indicated.

Practically the same effects could be produced and the same method of testing applied if instead of rotating the magnet or magnetic field around the object, the object was rotated in the magnetic field, and this converse action I consider within the scope of the invention but for most purposes I prefer to rotate the magent or magnetic field.

The simple form of apparatus shown in Figs. 1 and 2 could be used for testing various objects, but was more particularly designed for laboratory use.

Figure 10:
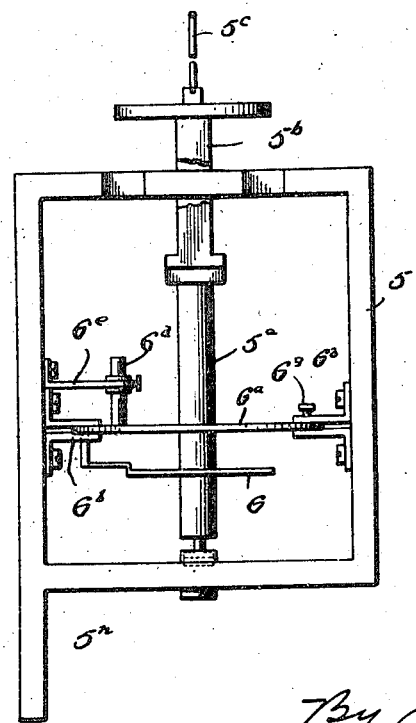
Figure 10 is a side view thereof, and Figure 11 an edge view of the object holding devices.
Figure 11:
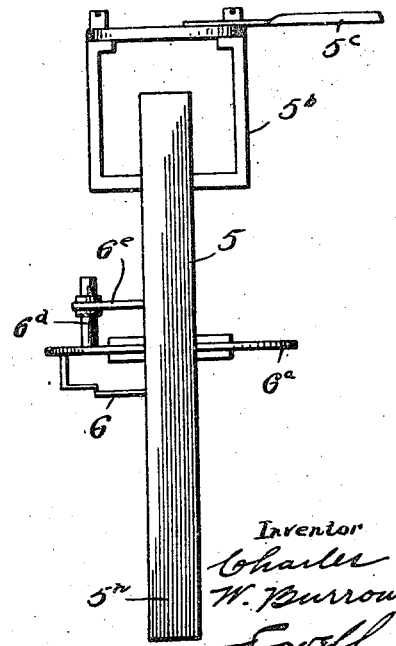

A commercial form of the apparatus is shown in Figures 3 to 13. This includes a three-phase electro-magnet, the core portions 1, 1$^a$ and 1$^b$, of which are preferably made of laminated plates of magnetic material of high permeability and low core loss and these cores are surrounded by wire coils 1$^c$. These core portions are preferably united by forming the cores and yokes of approximately U-shaped plates; each plate forms part of two adjacent core pieces and the connecting yoke, and the plates are arranged as shown in Fig. 5, so that there will be a uniform and continuous metal conduit for the magnetic lines of force at the base of the apparatus between the several cores 1, 1$^a$ and 1$^b$. These laminated plates may be mounted on a base member 2, which may be made of non-magnetic material of any suitable construction and is provided with pairs of radially disposed flanges 2$^a$ to and between which the yokes are fastened by means of bolts 2$^b$ as indicated in the drawings (Fig. 13).

The upper ends of the cores 1$^a$ are connected to and by a plate 3 which should be made of non-magnetic material and is provided with openings 3$^a$ for the upper ends of the cores, and may be supported on and fastened to the upper ends of posts 2$^c$ rising from base 2 intermediate the poles as shown. The binding posts for the electrical connections to and between the several coils 1$^c$ are arranged on the base 2, as shown at 1$^n$ and 1$^o$ so that the coils of several cores may be properly connected in sequence.

The upper magnetic pole pieces 1$^e$, 1$^f$ and 1$^g$ (Figs. 6 and 7) may be made separate from the cores; and in the construction shown are made of laminated plates like the cores and attached to a removable top plate or casting 4 which is provided with pairs of parallel radially disposed flanges 4$^a$ to and between which the pole pieces are secured by means of bolts 4$^b$ as indicated in the drawings.

Plate 4 is provided with depending studs 4$^c$ corresponding in position to posts 2$^c$ and adapted to overlie the same. And the plate 4 may be detachably secured to posts 2$^c$ by means of bolts 4$^e$ passing through openings in studs 4$^c$ and engaging threaded sockets in posts 2$^c$ as shown. When plate 4 is in position over the plate 3 the under sides of the poles 1$^e$, 1$^f$, 1$^g$ have a close metallic contact with the upper ends of the cores 1, 1$^a$, 1$^b$, and form magnetic continuations of the cores; and a magnetic field will be created adjacent to and intermediate the ends of these poles 1$^e$, 1$^f$, 1$^g$ when parts are properly assembled and the magnet is energized.

The base 2 is preferably, and plates 3 and 4 should be, made of non-magnetic material so that they will not disturb the lines of force, and the most intense field of force will be established between the inner ends of the poles 1$^e$, 1$^f$, 1$^g$.

Arranged between the magnet's coils and below the plate 3 is a frame 5 (Figs. 7–10 and 11) which may be supported and guided in brackets 3$^e$, 3$^f$ on the plate 3, and is preferably removable and replaceable. The frame 5 has a stud $5^n$ on its lower end which is adapted to be engaged with a socket $2^n$ in a stud on base member 2, see Fig. 7, to hold the frame securely and vertically adjustably in place.

In frame 5 is a rotatable spindle $5^a$, which may be mounted on pivot bearings as shown, or other suitable bearings, so that it will turn without perceptible friction. To the spindle $5^a$ is connected one end of a spring 6, (Figs. 7 and 11) the other end of which is connected to a relatively fixed point, and its tension may be regulated in any suitable manner. As shown the outer end of the spring is attached to an annulus $6^a$ guided in brackets $6^b$ on the sides of the frame 5; and this annulus has internal teeth engaged by a small pinion $6^c$ on a key-shaft $6^d$ (Figs. 7 and 9) journaled in a bracket $6^e$ attached to the frame 5; and by turning key $6^g$ the annulus can be turned to regulate the tension of the spring 6 and the annulus can be locked when adjusted by any suitable means.

As shown shaft $5^a$ carries a yoke $5^b$ on its upper end, which embraces and rises above the top bar of the frame 5 and carries an object support $5^d$, (Figs. 7 and 8) which may be detachably attached thereto; said support being made of non-magnetic material, and has in the example shown an annular portion $5^e$ over which a ball race R to be tested can be removably fitted; such ball race being readily replaceable or removable from the support $5^d$. An indicating finger $5^c$ is attached to yoke $5^b$ and is bent so that its outer end moves past a graduated scale 7 which may be suitably supported upon the plate 3, as indicated in the drawings. The scale 7 lies beneath a sight opening $4^p$ in plate 4, which opening may be covered by a glass $4^r$ as shown.

The ball-race R to be tested can be supported closely adjacent to and between the inner ends of the poles $1^e$, $1^f$, $1^g$, and if the magnets were rotated, such ball race would be subjected to the action of a rotative magnetic field. In the construction shown, however, instead of rotating the magnet, the coils are energized successively by the components of a three-phase current, or by a suitably commutated direct current, so as to create a rotative or whirling magnetic field of force between the poles. This rotative magnetic field will establish a magnetic flux or stress in the ball race or object R which will tend to cause this race to turn with the rotating field, and amount of the torque and the extent to which the race will be turned will depend upon the physical properties of the race and the resistance of the spring 6 to rotatory displacement of the spindle $5^a$ which carries the race or object to be tested.

The specific constructions of parts shown are not essentials of the present invention and may be varied by skilled mechanics to suit the particular objects to be tested.

I will describe the method and use of the apparatus shown in Figs. 3 to 11 in testing ball-races for ball bearings.

It is known that two pieces of steel or iron may differ in any one or a number of particulars and it is also known that each physical difference has an effect upon the magnetic properties of such piece of steel, that is, any two pieces of steel or objects which differ in certain physical particulars will likewise show corresponding magnetic differences.

Assuming that the desired physical properties of a race have been determined and such a race placed on the support $5^d$ and the parts adjusted so that when the current is on and the magnets energized the indicator $5^c$ will stand at the "0" point on the scale for instance; it follows that if such standard race is removed and another race is placed on the support which exactly conforms to the standard race in physical properties the pointer will move to the point 0 when the magnets are energized, a standard current being always used. If a race varies in any physical particular from the standard race, that fact will be shown by a corresponding variation in the amount of deflection of the support $5^d$ and indicator $5^c$, and if this variation comes above or below certain predetermined limits, such race must be rejected.

In this manner and by this method and apparatus an operator can very rapidly test any number of races or objects designed to be of the same quality and size, and can readily detect and separate from the others any race which does not come up to, or which falls below, the required standard; as determined by the deflection of the pointer on the scale when such race is placed in the apparatus.

For instance if a race be too hard the indicator will move beyond the desired limit on the scale, and such hard races which are very brittle and liable to break under sudden shock, can be detected and rejected, and they can be kept together for proper treatment to reduce their hardness. On the other hand, if a race be too soft the indicator will not be moved to the proper limit and such excessively soft races can be detected, removed and placed together for further heat treatment.

Many of the changes that are brought about by adding certain chemical constituents to steel are well known, and the corresponding changes in their magnetic properties have been studied. With increasing carbon content there is an increase in hardness and tensile strength and a decrease in toughness. Magnetically an increase in carbon content is accompanied by an increase in coercive force and hysteresis, and a decrease in permeability.

Mechanical operations also bring about corresponding changes in both the mechanical and the magnetic properties of steel. The cold drawing of a carbon steel increases its tensile strength and simultaneously increases its coercive force and hysteresis. Cold drawing also decreases the magnetic permeability.

That variations are caused by differences in heat treatment upon the properties of steel is known—f. i. a one per cent carbon steel quenched at a temperature above its critical point has a greater tensile strength than the same material in the annealed condition. Its hardness is also increased while its toughness is greatly decreased. Magnetic changes of corresponding importance also result from such quenching; such quenched steel having greater coercive force, greater hysteresis, and lower permeability.

These facts are well known and the relations between differences in physical properties and differences in magnetic properties have been sufficiently scientifically established to enable my magnetic analyzing machine to be so adjusted and the scale so calculated that when the object to be tested is placed thereupon and subjected to the action of a rotating magnetic field, or rotated within the magnetic field the differences in physical properties will be detected as stated.

Concisely stated the at present preferred practical apparatus consists of a rotatable member and a stationary member. The movement of the rotatable member, whether object or magnet, is constrained by means whose resistance becomes a factor in determining the physical nature of the object.

An object such as a pipe or rod may be rotated on its longitudinal axis between the poles of the magnet and simultaneously moved longitudinally between the poles, or the magnet moved longitudinally of the object, and in this way the physical properties of each cross section of such object can be tested, by the method hereinabove explained. In this way rods, tubes, rails, bars, etc., can be tested to detect inhomogeneities such as a blow holes, strains, flaws, etc.

As the power necessary to rotate the magnetic field, or turn the magnet, is greater when the object is in place than when it is not; and likewise the power necessary to rotate the object is greater when the electromagnet is excited than when it is not excited,—therefore the power necessary to drive the rotating part (whether magnet, field or object), becomes a measure of the hysteresis of the object and therefore of its mechanical hardness.

While in both the laboratory and the commercial apparatus the object to be tested is placed on a substantially fixed support and the magnetic field rotates around the object it would be practical to rotate the object within a stationary field in which case the effect would be the same with the field rotating relatively to the object. In other words substantially the same magnetic effect would be produced in the object by whirling the object in a magnetic field as by whirling the magnetic field around the object as in each case there occur the same changes of magnetic flux within the object, the same magnetic stresses are produced in the object, and there is the same interaction between the fixed and rotating parts and by measuring the displacement of the object or field relative to a fixed point in either case the physical properties of the object can be determined in the manner hereinbefore explained. The invention therefore is not limited to any specific form of apparatus as the method of testing may be employed with any apparatus constructed and operated to produce a relative whirling or turning of the object and magnetic field, as and for the purpose stated.

I claim:

1. The herein described method of ascertaining the hardness, tensile strength, homogeneity, presence of flaws and previous heat treatment, of magnetizable objects, consisting in subjecting such object to the action of a relatively rotating or whirling magnetic field, yieldingly restraining the relative deflection of said objects and field, and determining the physical properties of the object by the extent of the magnetic interaction or strength of the torque developed between the object and the field.

2. The herein described method of ascertaining the hardness, tensile strength, homogeneity, presence of flaws and previous heat treatment of an object; consisting in producing a rotating or whirling magnetic field, placing such object in said field, yieldingly restraining the relative rotation of said objec and field, observing the deflection of such object caused by such magnetic field in relation to a relatively fixed point, and determining the physical properties of the object by the extent of such relative deflection.

3. The herein described method of ascertaining the hardness, tensile strength, homogeneity, presence of flaws, and previous heat treatment of approximately circular and spherical steel objects, consisting in placing such objects within a relatively rotating or whirling magnetic field, yieldingly restraing the relative rotation of such object and field, observing the deflection of such object relative to the field, and determining the properties of the object by the extent of such deflection.

4. The herein described method of ascertaining the hardness, tensile strength, homogeneity, presence of flaws, and previous heat treatment of approximately circular and spherical steel objects, consisting in producing a rotating magnetic field, placing such object in said field, restraining the relative rotation of said object and field, observing the deflection of such object caused by such magnetic field in relation to a relatively fixed point, and determining the physical properties of the object by the extent of such relative deflection.

5. Apparatus for testing objects, comprising a three-phase electromagnet the upper pole pieces of said magnet being removable and changeable, means disposed intermediate the poles of the magnet adapted to carry the object to be tested, and means for indicating the displacement of the object.

6. Apparatus for testing objects comprising a three-phase electromagnet the upper pole pieces of said magnet being removable and changeable, a support disposed intermediate the upper poles thereof adapted to carry the object to be tested, means for yieldingly restraining the rotation of said object, and means for indicating the displacement of the object.

7. The herein described apparatus for testing objects, comprising a three-phase electromagnet the upper pole pieces of said magnet being removable and changeable; a removable support disposed intermediate the upper pole pieces adapted to carry the object to be tested, means for yieldingly restraining the rotation of said support; and means for indicating the displacement of the object.

In testimony that I claim the foregoing as my own, I affix my signature.

CHARLES W. BURROWS.